(12) United States Patent
Colomar

(10) Patent No.: US 10,378,117 B2
(45) Date of Patent: Aug. 13, 2019

(54) SYSTEM FOR PRODUCING DIHYDROGEN, AND ASSOCIATED METHOD

(71) Applicant: ELECTRICITE DE FRANCE, Paris (FR)

(72) Inventor: David Colomar, Haguenau (FR)

(73) Assignee: ELECTRICITE DE FRANCE, Paris (FR)

( * ) Notice: Subject to any disclaimer, the term of this patent is extended or adjusted under 35 U.S.C. 154(b) by 0 days.

(21) Appl. No.: 16/068,101

(22) PCT Filed: Jan. 4, 2017

(86) PCT No.: PCT/FR2017/050017
§ 371 (c)(1),
(2) Date: Jul. 3, 2018

(87) PCT Pub. No.: WO2017/118812
PCT Pub. Date: Jul. 13, 2017

(65) Prior Publication Data
US 2019/0017181 A1   Jan. 17, 2019

(30) Foreign Application Priority Data
Jan. 4, 2016 (FR) ...................... 16 50007

(51) Int. Cl.
*C25B 1/12* (2006.01)
*C25B 15/02* (2006.01)
*C25B 15/08* (2006.01)

(52) U.S. Cl.
CPC ................ *C25B 1/12* (2013.01); *C25B 15/02* (2013.01); *C25B 15/08* (2013.01); *Y02E 60/366* (2013.01)

(58) Field of Classification Search
CPC ............ C25B 1/12; C25B 15/02; C25B 15/08
See application file for complete search history.

(56) References Cited

U.S. PATENT DOCUMENTS

2013/0048507 A1   2/2013   Kurashina et al.
2015/0340749 A1   11/2015  Chaudron
2017/0145570 A1*  5/2017   Herold .................... C25B 15/08

FOREIGN PATENT DOCUMENTS

EP   2803755 A1   11/2014

OTHER PUBLICATIONS

International Search Report and Written Opinion received for PCT Patent Application No. PCT/FR2017/050017, dated Apr. 26, 2017, 14 pages.

(Continued)

*Primary Examiner* — Nicholas A Smith
(74) *Attorney, Agent, or Firm* — Womble Bond Dickinson (US) LLP

(57) ABSTRACT

The invention relates to a system (1) for producing dihydrogen, comprising: an electrolyzer (2) suitable for performing water electrolysis and for producing dioxygen and dihydrogen; a dihydrogen compressor (3); a dihydrogen cooler (4); a main circuit (10) of dihydrogen from the electrolyzer (2), on which at least the compressor (3) and the cooler (4) are successively arranged; and an auxiliary circuit (20) of dioxygen and residual water vapor from the electrolyzer (2), the system being characterized in that it also includes: a condenser of said residual steam; the cooler (4) comprises an expander, an exchanger and a heat-storage module; the condenser, the expander and the exchanger being successively arranged on the auxiliary circuit (20), the exchanger establishing a heat exchange between the dihydrogen compressed by the compressor (3), the dioxygen expanded by the expander and the heat-storage module.

16 Claims, 6 Drawing Sheets

(56) References Cited

OTHER PUBLICATIONS

International Preliminary Report on Patentability received for PCT Patent Application No. PCT/FR2017/050017, dated Jul. 19, 2018, 12 pages.
"French Preliminary Search Report," FR Application No. 1650007 (dated Sep. 7, 2016) (with English translation cover sheet).

\* cited by examiner

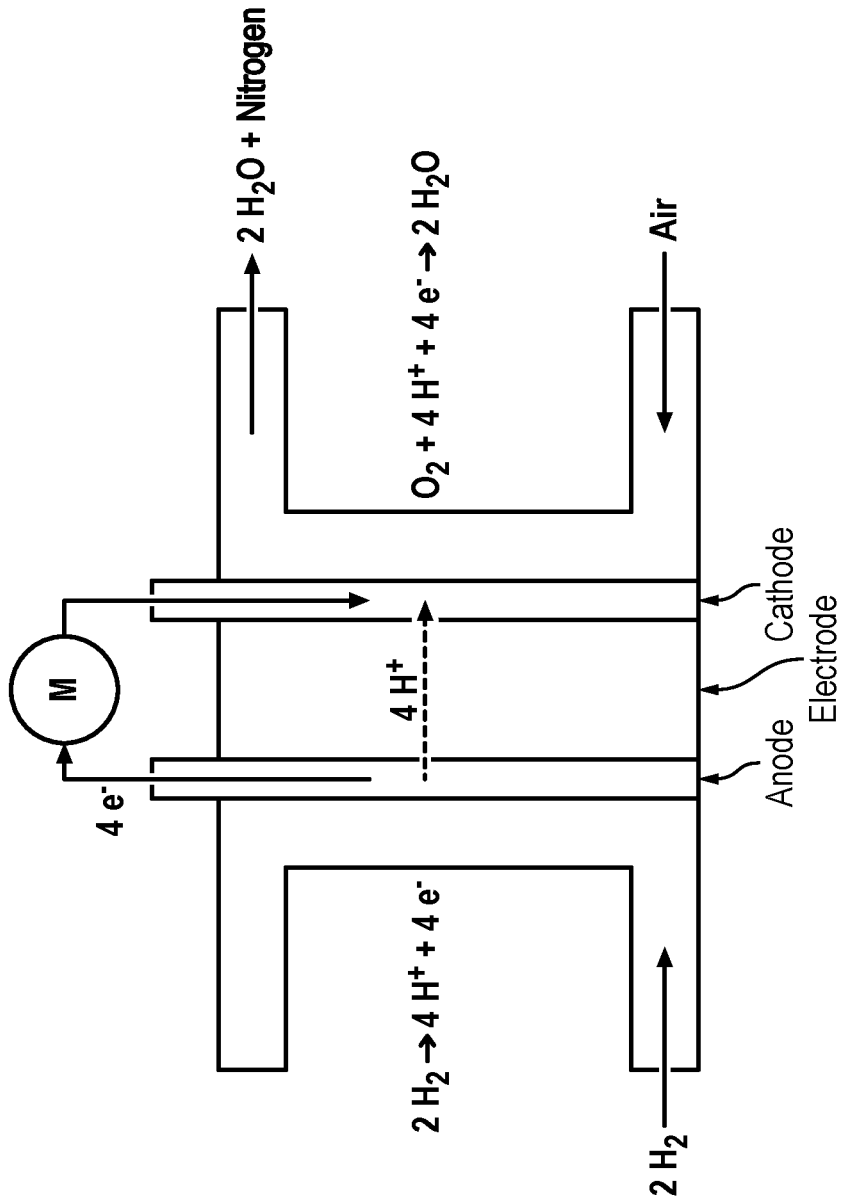

SYSTEM FOR PRODUCING DIHYDROGEN, AND ASSOCIATED METHOD

GENERAL TECHNICAL FIELD

The present invention relates to a dihydrogen production system by means of electrolysis.

STATE OF THE ART

Within a context of strong development of decarbonised solutions, that is low carbon dioxide emissive solutions, for mobility and transport of goods and passengers, dihydrogen appears as a promising fuel.

Its use, associated with fuel cells and an electric motor in a vehicle, can be an alternative to fossil fuels, especially if it is produced by energies which are themselves clean, in particular by water electrolysis. Some car manufacturers, like Toyota, have already begun to market hydrogen vehicles, others will launch their first vehicles by 2020.

The operation of a fuel cell (an example of which is represented in FIG. 1a) is governed by the following oxidation-reduction reactions:

at the anode: $2H_2 \rightarrow 4H^+ + 4e^-$ at the cathode: $O_2 + 4H^+ + 4e^- \rightarrow 2H_2O$.

The flow of electrons produced at the anode can thus supply an electrical load before being forwarded to the cathode.

Hydrogen is nowadays predominantly produced in large quantities by hydrocarbon steam reforming, mainly from natural gas (methane, the steam reforming reaction being thereby described by the following equation: $CH_4 + 2H_2O +$ heat $\rightarrow 4H_2 + CO_2$), transported and delivered by trucks in cylinder frames at 200 bar to the service station, where it is compressed in a compressor up to pressures of 420 to 880 bar, before being stored in high pressure tanks in the service station (indeed, the low volume density of dihydrogen gas—89 grams, that is 3.54 kWh energy, in one cubic meter of dihydrogen under normal temperature and pressure conditions—implies to compress it at 350 bar or 700 bar according to the vehicle to reach a sufficient density for use as a fuel).

This steam reforming production method has the advantage of being industrially mature and cheap. However, it has many drawbacks: it consumes fossil energy, is high carbon dioxide emitting, and is well adapted only to large scale production in large size units (up to several hundreds of MW). In the case of a decentralised hydrogen use, the hydrogen produced must thus be transported by trucks, and must be delivered in cylinder frames, which causes substantial economic and energy costs.

Thus, industrialists increasingly opt for an alternative technology: water electrolysis, which uses electricity instead of fossil energies to separate dihydrogen from dioxygen and can be made in small decentralised units, or even in the place where the hydrogen is used, for example the service station. The electrolysis principle can be summarised by the following equation: $2H_2O + electricity \rightarrow 2H_2 + O_2$.

Electrolysis has many advantages: it does not produce carbon dioxide if electricity is decarbonised (for example of nuclear or renewable origin), it is flexible and can thus provide services for the electrical grid and it is a modular technology, which can be of a small size (less than one MW) and thus well adapted to decentralised production. On the other hand, it has the drawback to consume an expensive energy: electricity. Thus, its yield is a crucial issue.

FIG. 1b represents a known facility comprising an electrolyser 2 consuming 55 kWh of electric energy for its operation. This type of electrolyser 2 releases into the atmosphere (via an auxiliary circuit 20) ½ mole of dioxygen per mole of dihydrogen produced. The dihydrogen is produced at at least 16 bar, advantageously at least 30 bar, and preferably about 35 bar, 60° C., then purified and cooled inside the electrolyser, before leaving it at 35 bar and 25° C. Then, it is conveyed to a storage buffer reservoir 11 where it is stored at 35 bar.

Dihydrogen is then conveyed from a main circuit 10 to the compressor 3, which it leaves at a pressure in the order of 420 bar or 880 bar, depending on whether it is for supplying vehicles at 350 bar or 700 bar. The compressor consumes between 4 and 6 kWh per kilogram of compressed dihydrogen (+/−1 kWh). A mean value of 5 kWh electricity per kg of compressed dihydrogen has been retained.

Dihydrogen continues to circulate on the main circuit 10 to a piece of management equipment 30, which is mainly comprised of a set of valves and different sensors, which redirects it to a high pressure storage 31, 32, at at least 400 bar or 800 bar depending on the tanks. When vehicles come to fill up and that the pressure in the high pressure tanks 31 (400 bar) and 32 (800 bar) decreases below a threshold value, the compressor 3 gets started and draws dihydrogen from the buffer tank 11, until the high pressure tanks 31, 32 are full or that the pressure in the buffer tank 11 is decreased to its minimum pressure (which is supposed to be 10 bar here), and so forth.

When a vehicle comes to the service station, the management piece of equipment 30 for managing dihydrogen draws dihydrogen from the high pressure storage 31, 32 and conveys it to a cooler 4, in which it is cooled at a temperature between −20° C. and −40° C. depending on the operator's choice of the station.

Indeed, the hydrogen refill of a vehicle is made by simple pressure transfer, the gas stored in the station being discharged in the vehicle until the vehicle tank is full or that the pressure balance is reached.

But, during this transfer, the dihydrogen temperature substantially raises because of the mechanical energy supply (residual hydrogen within the tank undergoes a very high compression). If the transfer process is not controlled, the dihydrogen temperature can theoretically reach values higher than 100° C. But, components used nowadays by the automobile industry for the hydrogen management and onboard storage are made from polymers, which do not withstand temperatures higher than 80° C. That is why refill, protocols widely used in the industry (in particular the SAE J2601 standard) recommend to cool dihydrogen at −20° C., or even −40° C. before refilling the vehicle.

This cooling is made using a cooler 4, which is typically a refrigerating machine for example of the heat pump type making a coolant to change phase. Such a technology is costly in terms of investment and maintenance, and highly energy consuming: the cooler 4 consumes about 1 kWh electricity per kilogram of cooled dihydrogen.

The dihydrogen cooled is then distributed via pumps 5, depending on whether it is a user equipped with a vehicle at 350 bar or 700 bar.

The energy yield of such a device is the following one:

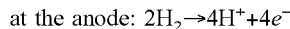

$r = PCS/Qinv = 39.4/(55+5+1)$

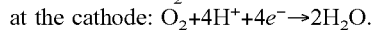

$r = 64.6\%$.

This solution has two drawbacks: a high investment cost in the station, and a low yield.

Thus, it would be desirable to reduce investment costs and energy costs associated with the production and management of compressed hydrogen which is cooled for being used in vehicles, in order to speed up breakthrough of an industrial large scale hydrogen use.

DISCLOSURE OF THE INVENTION

The invention suggests to overcome these drawbacks by providing according to a first aspect, a system for producing dihydrogen comprising:
- an electrolyser suitable for implementing water electrolysis and producing dioxygen and dihydrogen;
- a dihydrogen compressor;
- a dihydrogen cooler;
- a main circuit of dihydrogen from the electrolyser, on which at least the compressor and the cooler are successively arranged;
- an auxiliary circuit of dioxygen and residual water vapour from the electrolyser, the system being characterised in that:
- it further comprises a condenser of said residual vapour;
- the cooler comprises an expander, an exchanger and a heat storage module;
- the condenser, the expander and the exchanger being successively arranged on the auxiliary circuit, the exchanger operating heat exchange between the dihydrogen compressed by the compressor, the dioxygen expanded by the expander and the heat storage module.

The device according to the invention is advantageously completed by the following characteristics, taken alone or according to any technically possible combination thereof:
- the condenser operates heat exchange between the dioxygen and the residual water vapour from the electrolyser with the dioxygen leaving the exchanger of the cooler;
- the exchanger is arranged within the heat storage module;
- the expander is also arranged within the heat storage module;
- the cooler further comprises an insulating wall wrapping the heat storage module;
- the heat storage module uses at least one phase change material;
- the heat storage module comprises a first zone filled with a first phase change material having a first melting temperature, and a second zone filled with a second phase change material having a second melting temperature higher than the first melting temperature;
- the exchanger extends within each of the first and second zones so as to be in successive heat exchange with each of the first and second phase change materials;
- the exchanger is a counter-current exchanger, such that the dioxygen expanded by the expander is in heat exchange with the first phase change material and then the second phase change material, and the dihydrogen compressed by the compressor is in heat exchange with the second phase change material and then the first phase change material;
- the first melting temperature is lower than −20° C., and the second melting temperature is between 0 and 20° C.;
- the first melting temperature is lower than −40° C., a dryer being arranged on the auxiliary circuit between the condenser and the expander;
- the system further comprises a piece of management equipment for managing the dihydrogen arranged on the main circuit between the compressor and the cooler, said piece of management equipment being connected to at least one high pressure tank, and configured so as to provide dihydrogen to the cooler intermittently.
- The system also comprises at least one piece of distribution equipment arranged on the main circuit downstream of the cooler, the piece of management equipment being configured to provide dihydrogen to the cooler when the piece of distribution equipment is used;
- the compressor is also configured so as to provide dihydrogen to the piece of management equipment intermittently, such that the pressure in said high pressure tank is between a minimum threshold and a maximum threshold;
- the dioxygen and dihydrogen have at the outlet of the electrolyser pressures of at least 13 bar, advantageously at least 30 bar.

According to a second aspect, the invention relates to a method for producing dihydrogen characterised in that it comprises the steps of:
- electrolysing water in an electrolyser so as to produce dioxygen and dihydrogen;
- compressing the dihydrogen by a compressor;
- condensing residual water vapour mixed with the dioxygen in a condenser;
- expanding the dioxygen in an expander;
- cooling compressed dihydrogen by heat exchange with the dioxygen expanded via an exchanger in heat exchange with a heat storage module.

DESCRIPTION OF THE FIGURES

Further characteristics, purposes and advantages of the invention will become more apparent from the description that follows, which is purely illustrative and in no way limiting, and which should be read with regard to the appended drawings in which:

FIG. 1a, previously described, is a diagram of a known hydrogen cell;

In the different figures, similar elements bear the same reference numerals, and the temperature and pressure values indicated are only by way of non-limiting example.

DETAILED DESCRIPTION

General Architecture

Figure 2:
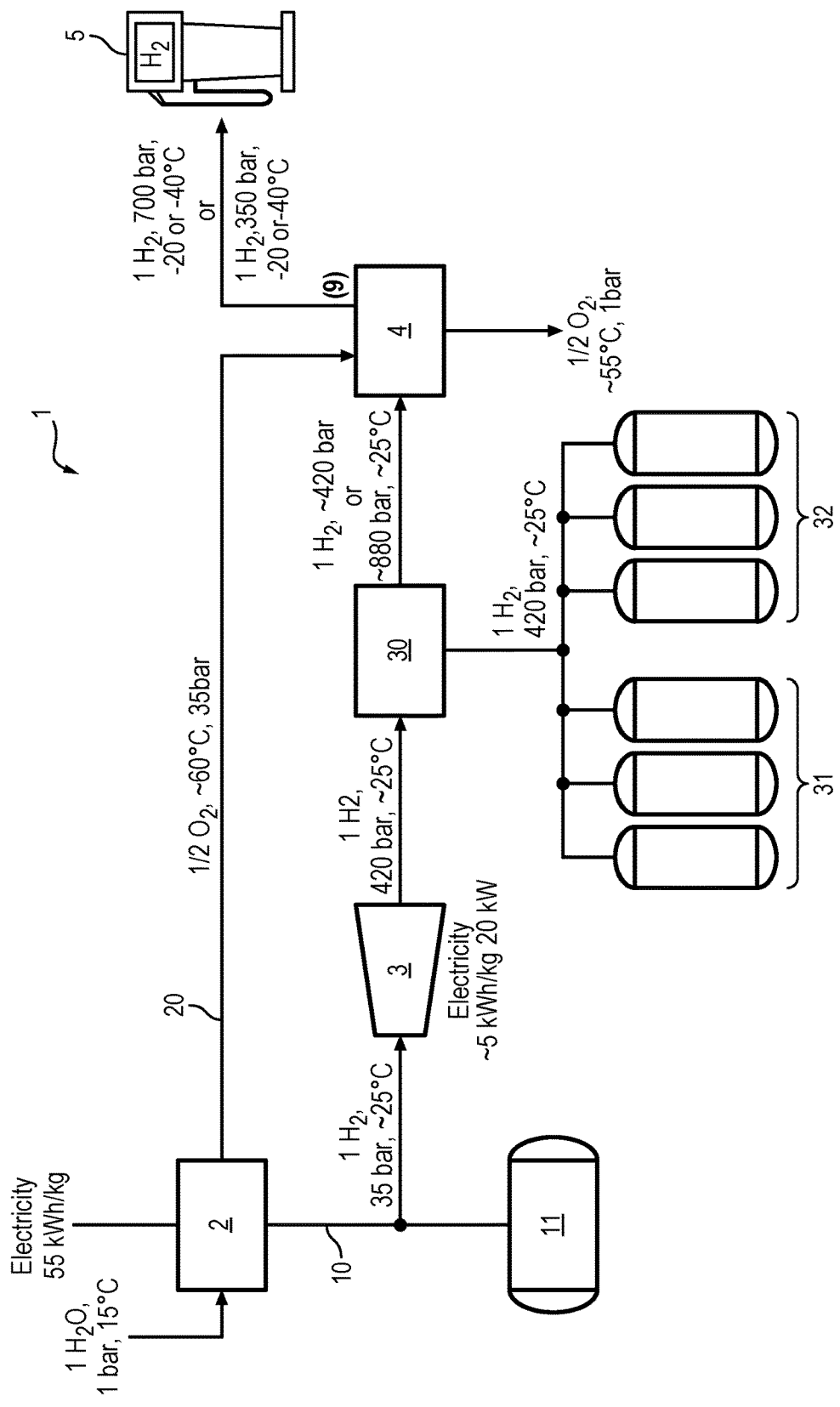
FIG. 2 is a diagram of a dihydrogen production system according to the invention.

FIG. 2 represents the present dihydrogen production system 1. As will be seen, this system is also advantageously a dihydrogen distribution system, in particular for vehicles. The system can thus take the form of a service station.

Figure 1B:
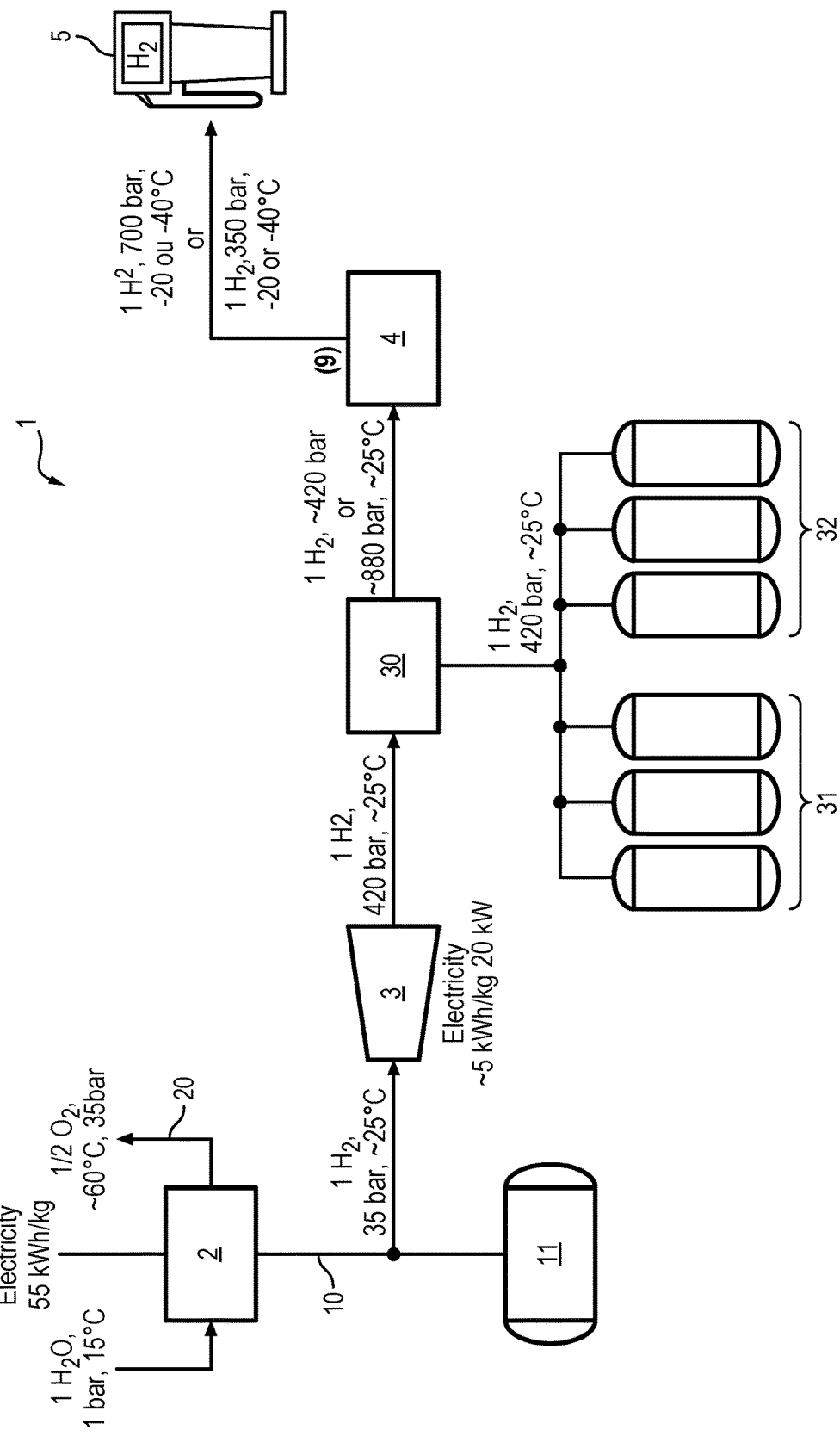
FIG. 1b, previously described, is a diagram of a known dihydrogen production system.

In any case, the system 1 has an overall architecture similar to that of the system in accordance with FIG. 1b, and is centred about an electrolyser 2 (which can be of many types) and a compressor 3.

The electrolyser 2 produces dihydrogen at its cathode, and dioxygen at its anode, which dioxygen is mixed with residual water vapour.

The system 1 thus comprises, as explained, a main circuit 10 of dihydrogen on which at least the electrolyser 2, the compressor 3, optionally a piece of management equipment 30 managing the dihydrogen, a cooler 4, and optionally pieces of distribution equipment 5 for distributing dihydrogen, in particular for vehicles (the pieces of equipment 5 are then of the "service station pump", possibly coupled with distributed volume measurement means and associated payment means) are successively arranged.

A branch of the main circuit 10 can draw dihydrogen at the outlet of the electrolyser 2 for a temporary storage on a buffer reservoir 11.

The system further comprises an auxiliary circuit 20 of dioxygen and residual water vapour from the electrolyser 2.

On the other hand, as explained, the piece of management equipment 30 for managing dihydrogen can comprise a set of high pressure tanks 31, 32 for storage at at least 400 bar and/or 800 bar.

Cooling

The present system 1 is distinguished by a use of the fatal dioxygen produced by the electrolyser 2 (circulating on the auxiliary circuit 20 of dioxygen and residual water vapour) as a cryogenic energy source.

In this purpose, the pressure energy contained in dioxygen is converted into a cryogenic energy in the cooling system 4 provided therefor. As will be seen later, this comprises for that purpose among other things, an expander 40, allowing an adiabatic expansion causing a dioxygen temperature drop up to negative temperatures, and a heat exchanger 41, in which the frigories generated by dioxygen expansion are used to cool dihydrogen up to the desired temperature. The exchanger 41 operates heat exchange between the dihydrogen and dioxygen without mixing them so as to keep dihydrogen purity.

It is noted that the expander 40 can be replaced by several expanders connected in series, in order to regulate dioxygen expansion and to approach an isothermal expansion, which would enable more frigories to be generated.

A thermodynamic analysis which has been conducted made it possible to demonstrate that the frigories produced by dioxygen expansion (0.34 kWh/kg dihydrogen, or more if the expansion is not purely adiabatic) is sufficient to lower up to −40° C. the temperature of the corresponding dihydrogen amount (0.33 kWh/kg in the worst case). The pressurised dioxygen is thus well adapted for cold production required for dihydrogen.

The yield of such a device is the following one:

$$r = PCS/Qinv = 39.4/(55+5)$$

$$r = 65.7\%.$$

1.1% yield is thus gained with respect to the known solution. Further, a potentially high power demand (higher than 20 kW), is removed, which can have a favourable impact on electric grid connection costs.

However, the implementation of this use faces two problems which, as will be seen, will be solved by the present invention.

First, the cold demand and oxygen production are not simultaneous.

Indeed, the piece of management equipment 30 is configured so as to provide dihydrogen to the cooler 4 intermittently. More precisely, the dihydrogen demand corresponds to a demand at a piece of distribution equipment 5 (i.e. a user fills up), and the management piece of equipment 30 is thus configured to provide dihydrogen to the cooler 4 when the distribution piece of equipment 5 is used.

But, the management piece of equipment 30 receives itself dihydrogen intermittently: the compressor 4 is typically also configured so as to provide dihydrogen to the management piece of equipment 30 such that the pressure in said high pressure tank 31, 32 is between a minimum threshold and a maximum threshold. There can be several minimum and maximum thresholds if there are several pressure levels, for example 400/440 bar and 800/880 bar if there are two storage pressure levels 31, 32.

The electrolyser 2 operates in turn more or less continuously, the dihydrogen produced being stored in the possible buffer tank 11 between 10 and 35 bar, in which the compressor 3 draws when necessary. It is quite possible that the electrolyser operates in turn intermittently, but in any case, its operation periods cannot coincide with the user's demand periods, which are unforeseeable by definition.

Then, oxygen cooling is likely to generate condensation, which would be immediately transformed into frost at a very low temperature and could make the operation technically unfeasible.

The present system enables these problems to be solved, by associating a condenser 21 of said residual vapour arranged on the auxiliary circuit 20 upstream of the expander 40 and a heat storage module 42a, 42b (equipping the cooler 4) in heat exchange with the exchanger 41.

This condenser is actually a drying system. Indeed, the decrease in the dioxygen temperature causes a condensation of water present in vapour phase in dioxygen. As will be seen, this enables dihydrogen to be dried free of charge while allowing time offset operations of the electrolyser 2 and the cooler 4.

Cooler

In reference to FIGS. 3a and 3b which represent two preferred embodiments which will be described in more detail later, the condenser 21 is advantageously an exchanger supplied with energy by heat exchange with the dioxygen leaving the exchanger 41 of the cooler 4. In other words, the dry dioxygen expanded by the expander 40 and that gave its frigories at the exchanger 41 is still at a low energy level (the maximum temperature of the heat storage module 42a, 42b as will be seen), typically at about 0° C.

By heat exchange with this fresh dioxygen, high pressure dioxygen mixed with residual water vapour from the electrolyser 2 is cooled sufficiently low for water condensation to occur.

The exchanger 41 is advantageously arranged within the heat storage module 42a, 42b, i.e. in direct heat exchange. This results in that the heat storage module 42a, 42b acts as a heat buffer: the frigories "excessively" fed by dioxygen are picked by this module 42a, 42b, and released in case of high demand to the pump 5.

More precisely, the cooler 4 is advantageously a substantially adiabatic piece of equipment, comprising an insulating wall 42 wrapping the heat storage module 42a, 42b, itself wrapping the exchanger 41 and optionally the expander 40 to recover as much energy as possible. It is noted that it is quite possible that the expander 40 remains external.

Many technologies exist for the heat storage module, first the use of a high heat capacity material (cold storage substantially in a ceramics, a refrigerant gel or liquid, the latter improving heat exchange), but preferably, the heat storage module 42a, 42b uses at least one phase change material. By phase change material—or PCM—it is meant any material capable of changing physical phase in a restricted temperature range, about a predetermined reference temperature called a melting temperature which characterises it.

A phase change material implements a heat transfer by latent heat. It can store or give energy by simple phase change, while preserving a constant temperature, that of the phase change (i.e. the melting temperature). In heat exchange with a medium at a temperature below the melting temperature, the phase change material is solidified by increasing the temperature of said medium; and in heat exchange with a medium with a temperature above the melting temperature, the phase change material is liquefied by decreasing the temperature of said medium.

More precisely, in case of excess dioxygen (low temperature at the exchanger 41 because dihydrogen has not a flow rate enabling all the frigories to be absorbed); these frigories are stored by solidifying the phase change material, and in case of dioxygen deficiency (high temperature at the exchanger 41 because dihydrogen has a high flow rate absorbing all the frigories without being sufficient to cool dihydrogen sufficiently), frigories are released by liquefying the phase change material.

In this case, a salted or glycolated water solution, having a low melting temperature (lower than −10° C.), which can be adjusted by varying the concentration could be chosen.

Preferably, the heat storage module 42a, 42b comprises a first zone 42a filled with a first phase change material having a first melting temperature, and a second zone 42b filled with a second phase change material having a second melting temperature higher than the first melting temperature.

This enables the exchanger 41 to extend within each of the first and second zones 42a, 42b so as to be in successive heat exchange with each of the first and second phase change materials.

In particular, the exchanger 41 is a counter-current exchanger, such that the dioxygen expanded by the expander 40 is in heat exchange with the first phase change material and then the first phase change material, and dihydrogen compressed by the compressor 3 is in heat exchange with the second phase change material and then the first phase change material.

This corresponds to a gradual heating of the expanded dioxygen, and a gradual cooling of dihydrogen.

Figure 3A:
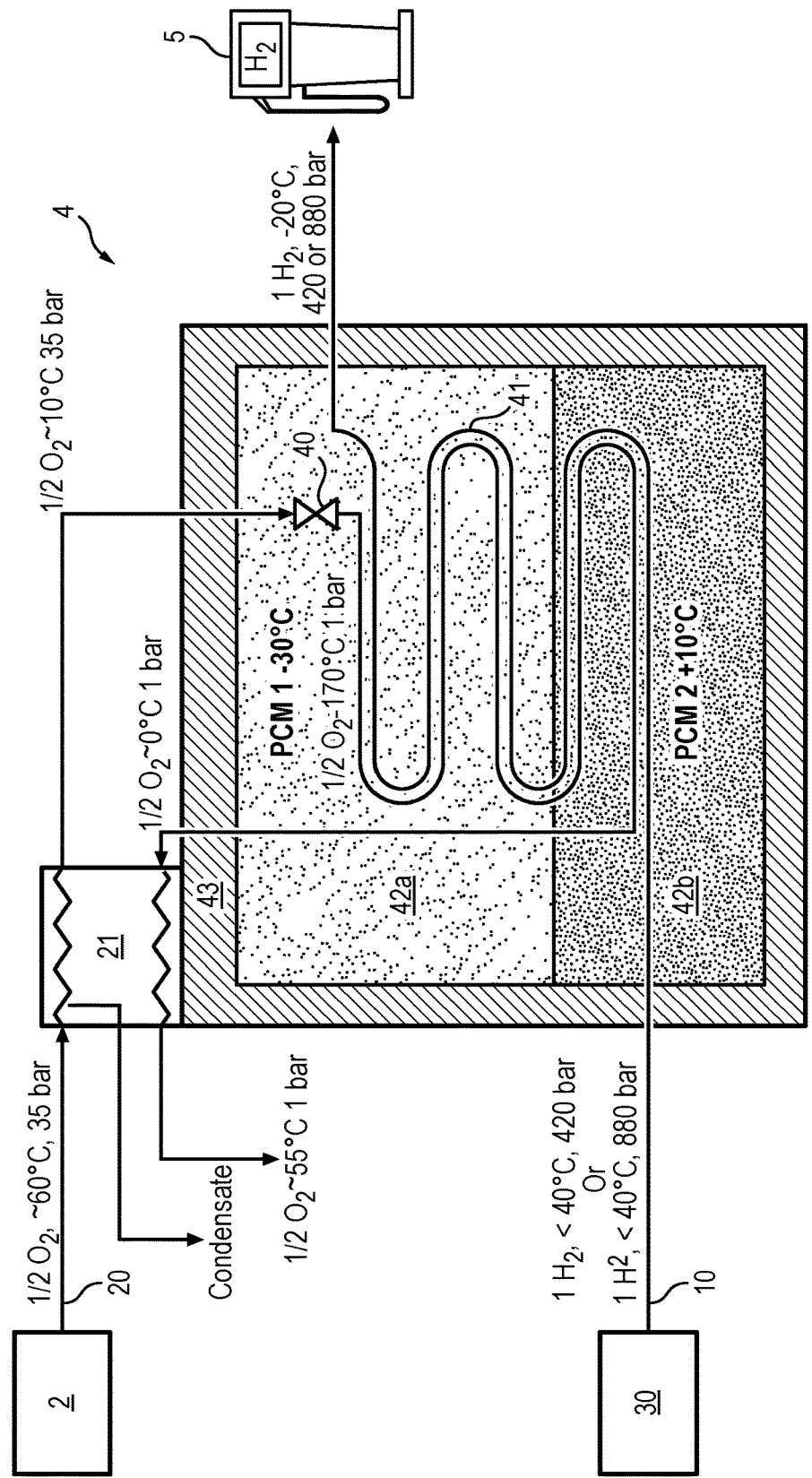
FIGS. 3a and 3b are diagrams of two particularly preferred embodiments of a cooler of a dihydrogen production system according to the invention.
Figure 3B:
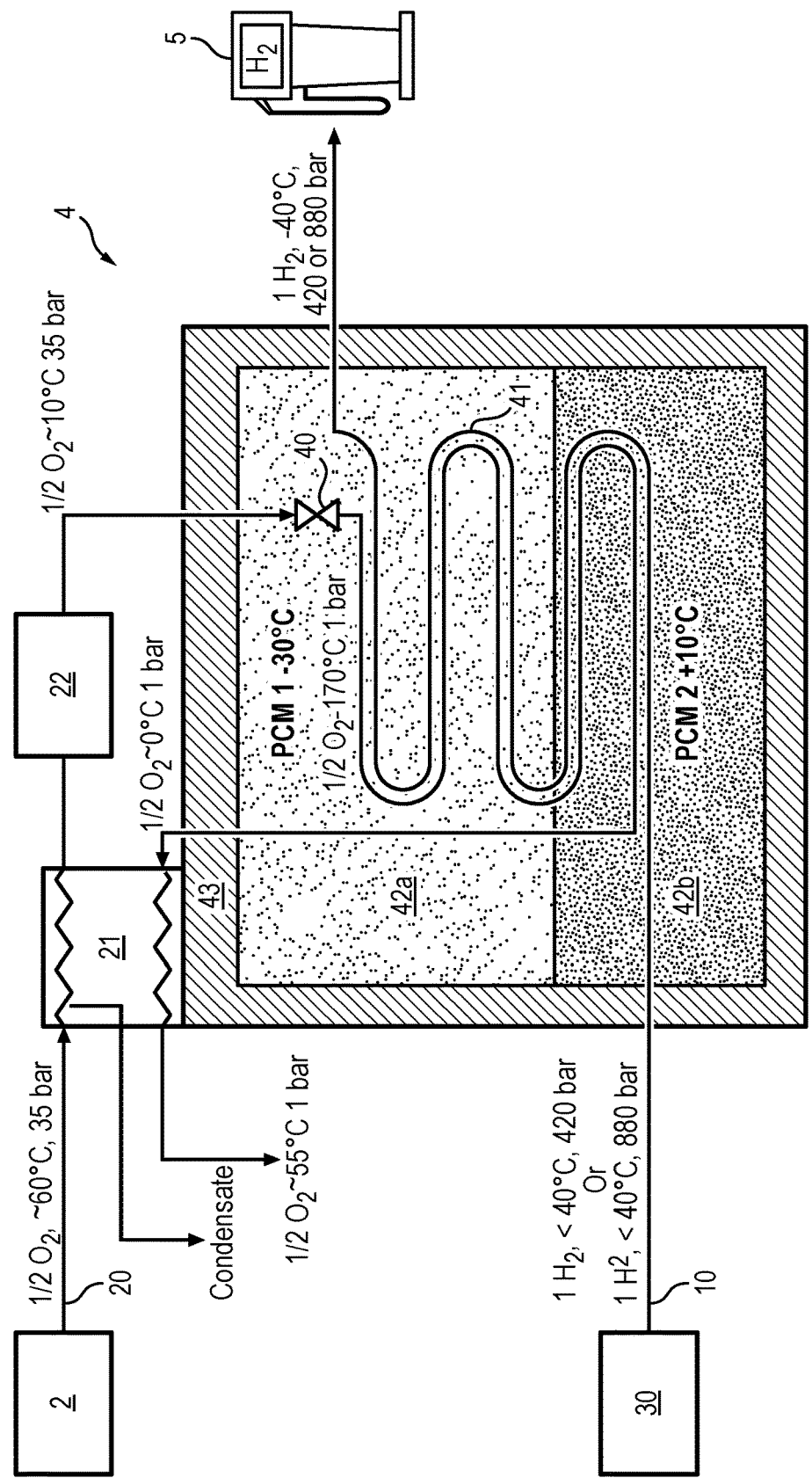

This very advantageous characteristic used in both preferred embodiments of FIGS. 3a and 3b allows a two-level heat storage, which enables low temperatures required for distributing dihydrogen to be more readily reached, while limiting as much as possible the external energy consumption.

The first melting temperature is advantageously lower than −20° C. (or even lower than −40° C.), and the second melting temperature is advantageously between 0 and 20° C.

It is possible to use only one phase change material. In this case, only one part of the heat field of dioxygen would be recovered, but this amount can be sufficient, if an adapted expansion profile is selected. Moreover, it is possible to use more than two phase change materials.

It is noted that the use of phase change materials as a frigory storage solution for the dihydrogen service station application is not the only solution (as explained, cold can be substantially stored in a ceramics or others) but has several advantages within the scope of this application, mainly an important storage mass density and a limited operating temperature range for the cooling system (−30° C./+10° C. instead of −170° C./0° C.) which limits heat losses and ensures operating stability. In the case of a use of a refrigerant liquid storing cold substantially, a temperature gradient can be created in the cooler 4 in order to recover the entire energy field (and reproduce the plurality of phase change materials).

It will also be noted that in a quite different note, the heat storage module can consist of a pressurised (typically 35 bar) dioxygen storage tank. In this case, it is dioxygen mechanical energy which would be stored in practice and not heat energy. Cold production then occurs on demand: dioxygen is expanded when a dihydrogen demand happens and not during the production of this dioxygen).

Preferably, a cold physical storage is however used, because storing dioxygen is expensive and takes up a lot of space (one or more reservoirs with a cumulated volume of 16 m$^3$ for a daily consumption of 100 kg dihydrogen).

In any case, the cooler 4 can be coupled to another conventional cooler (heat pump), which would not be used in normal operation, but only as a backup, in the case where cold production of the solution suggested could be insufficient. In this case, the conventional refrigerating unit could be far smaller than in prior art (FIG. 1b), which would enable the investment cost to be reduced.

First Preferred Embodiment

In reference to FIG. 3a, a first preferred embodiment of the system 1 is represented, which is equipped with a first phase change material having a first melting temperature of about −30° C. The second phase change material has a second melting temperature of about +10° C.

Dioxygen at 35 bar first enters via the condenser 21 where it is pre-cooled at 10° C. by the expanded dioxygen. The amount of condensate collected is evaluated at 24 g/kg H2. At 10° C., a 12 mBar vapour partial pressure remains in the dioxygen, that is 1.5 g/kg H2. After an expansion from 35 bar to 1 bar, this partial pressure will only be 1.5 mBar, which corresponds to a condensation temperature of −32° C.

The dioxygen temperature can thus drop up to this temperature without causing condensation, i.e. without risk of frost.

Then, the dioxygen leaves the condenser 21 and is conveyed to the cooler 4. It first passes through the expander 40 which drops its pressure from 35 bar to 1 bar and its temperature up to a negative value that can theoretically reach −170° C. (adiabatic expansion), but which will be more likely to be maintained at the temperature close to the minimum cooler temperature (the first melting temperature, herein −30° C.) by simultaneous heat exchange with the first phase change material of the first zone 42a (isothermal expansion).

Dioxygen leaves the expander 40 and then circulates in the first exchanger 41 which facilitates heat exchange with the first zone 42a, filled with the first phase change material. This can for example be a salted water solution characterised by its melting temperature, in the order of −30° C. Dioxygen exchanges frigories with this first phase change material, until its temperature reaches a value of −40° C. The first phase change material is solidified under the action of the heat transfer, and thus stores frigories.

Dioxygen is then conveyed (following the exchanger 41) to the second zone 42b, filled with the second phase change material, which is characterised by a second melting temperature in the order of +10° C., in which further frigories are stored by solidifying this second phase change material, until dioxygen reaches a temperature in the order of 0° C.

Dioxygen is then conveyed to the condenser 21 where the last available frigories are used to pre-cool pressurised dioxygen. Then, it leaves the condenser 21 at a temperature in the order of 55° C. and is discharged in the surrounding air.

Dihydrogen is conveyed from the piece of management equipment 30 to the cooler 4, where it successively passes through the second and first zones 42a, 42b (i.e. in contact with the second and then the first phase change material). These phase change materials release stored cold by switching to the liquid phase, and the dihydrogen is cooled up to at least −20° C.

The entire heat storage module 42a, 42b is insulated from the environment using the insulating wall 43, characterised by its suitability to the thermal insulation, for a temperature difference between indoors and outdoors up to 70° K.

Second Embodiment

In reference to FIG. 3b, a second preferred embodiment of the system 1 is represented, which is equipped with a first phase change material having herein a first melting temperature of about −50° C. The second phase change material still has a second melting temperature of about +10° C.

This configuration is suitable for cooling at at least −40° C. It is structurally identical to the first one, but however a further component is added before the expander 40, this is a dioxygen dryer 22. Indeed, pre-cooling drying in the condenser 21 does not enable a sufficient drying to be ensured in order to avoid condensation at temperatures lower than −30° C.

Therefore, there would be the risk, downstream of the expander 40, to have the formation of water droplets which would frost and could cause further maintenance requirements. Therefore, it is suggested to add the dryer 22 which is comprised for example of a moisture absorbing material (such as silica gels or alumina). Other technologies, for example with membranes, are possible.

By virtue of the presence of the pre-dryer (the condenser 21), the residual amount of vapour to be discharged into the dryer 22 is limited. It is evaluated at 1 g/kg H2. Thus, for a service station delivering 100 kg dihydrogen per day, the dryer 22 should be able to absorbed 100 g moisture per day. Such a dryer 22 is known, and can then be mechanically regenerated, using a low hot and dry dioxygen flow rate, for example that leaving the condenser 21 (55° C. and 1 bar), for example on a daily basis.

Thus, the dryer 22 does not require any electrical connection nor further electrical consumption and does not impact the yield gain achieved using the present system 1.

Figure 4:
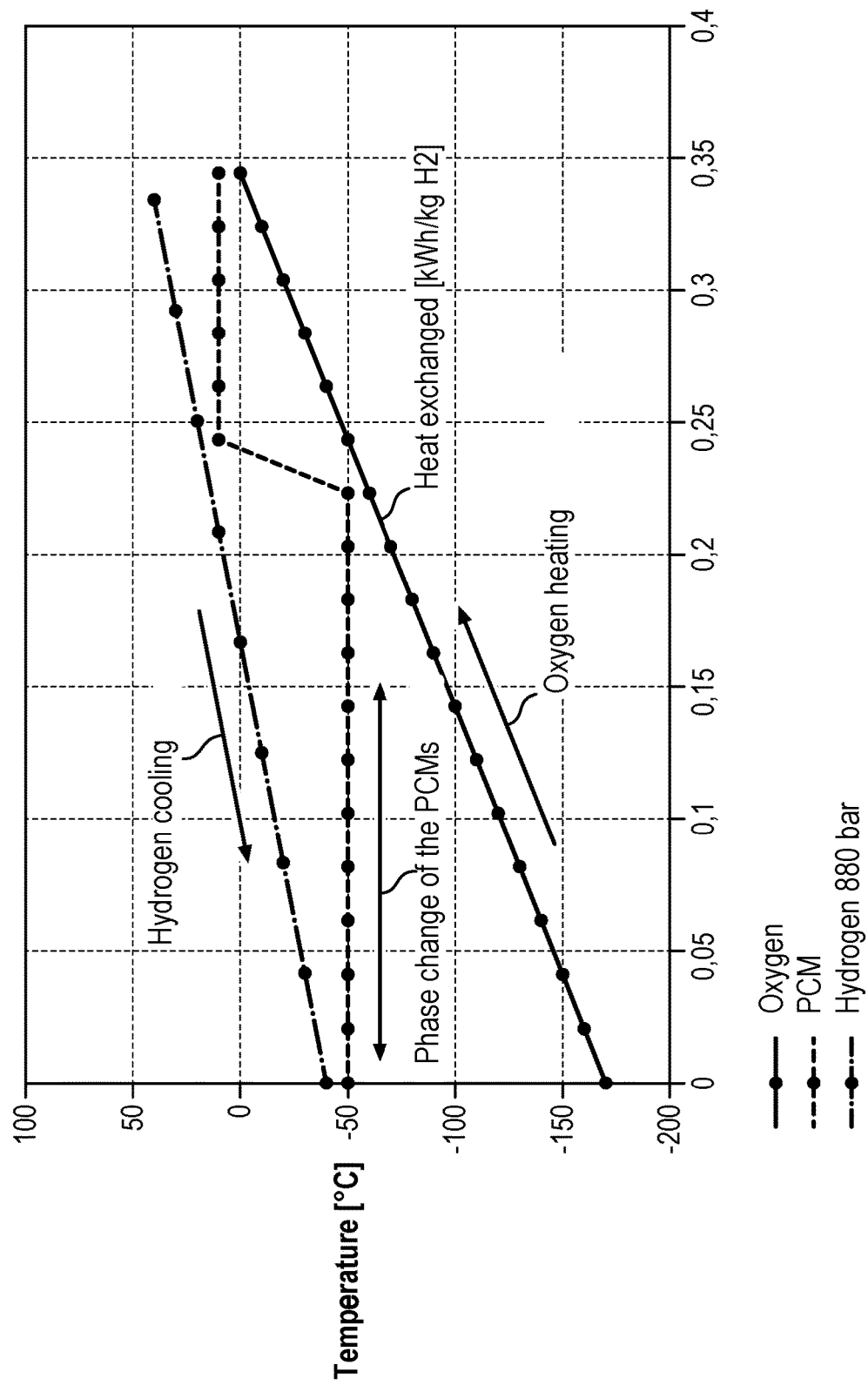
FIG. 4 represents a pinch analysis of the energy balances implemented in the cooling system in accordance with FIG. 3b.

FIG. 4 represents a pinch analysis of the energy balances (in the thermodynamic point of view) implemented in the cooling system in accordance with FIG. 3b. The advantage of assuming two phase change materials is readily understood.

Moreover, although FIG. 3b illustrates the case of a cooling at −40° C., it could be decided to employ the same dryer 22 for a cooling at −20° C. (case of FIG. 3a), in order to ensure absence of condensation.

It is noted that the concept described herein would be applicable for any other negative temperature today recommended by the SAE standard (for example −30° C.) or likely to be subsequently added thereto (in particular −10° C. or 0° C.). It is only sufficient to suitably choose the temperature of the phase change material(s), and to check whether a further dryer 22 is required or not.

Method

According to a second aspect, the invention also relates to a dihydrogen production method implemented by the system 1 according to the first aspect of the invention.

This method comprises steps of:
electrolysing water in an electrolyser 2 so as to produce dioxygen and dihydrogen;
compressing the dihydrogen by a compressor 3;
optionally, storing/releasing the dihydrogen compressed by a piece of management equipment 30;
condensing residual water vapour mixed with the dioxygen in a condenser 21;
expanding the dioxygen in an expander 40;
cooling (at −20° C./−40° C.) the compressed dihydrogen by heat exchange with the dioxygen expanded via an exchanger 41 (in particular a counter-current exchanger) in heat exchange with a heat storage module 42a, 42b (in particular a successive passage in two phase change materials so as to define two cooling levels for the dihydrogen corresponding to two heating levels for the expanded dioxygen);
optionally, recirculating the dioxygen being still fresh and leaving the exchanger 41 into the condenser 21 so as to supply it with energy free of charge;
and optionally distributing the cooled dihydrogen (at −20° C./−40° C.) by a piece of distribution equipment, typically for use in a service station.

The invention claimed is:

1. A system for producing dihydrogen comprising:
an electrolyser suitable for implementing water electrolysis and producing dioxygen and dihydrogen;
a dihydrogen compressor;
a dihydrogen cooler;
a main circuit of dihydrogen from the electrolyser, on which at least the compressor and the cooler are successively arranged;
an auxiliary circuit of dioxygen and residual water vapour from the electrolyser, the system being characterised in that:
it further comprises a condenser of said residual vapour;
the cooler comprises an expander, an exchanger and a heat storage module;
the condenser, the expander and the exchanger being successively arranged on the auxiliary circuit, the exchanger operating heat exchange between the dihydrogen compressed by the compressor, the dioxygen expanded by the expander and the heat storage module.

2. The system according to claim 1, wherein the condenser operates heat exchange between the dioxygen and the residual water vapour from the electrolyser with the dioxygen leaving the exchanger of the cooler.

3. The system according to claim 1, wherein the exchanger is arranged within the heat storage module.

4. The system according to claim 3, wherein the expander is also arranged within the heat storage module.

5. The system according to claim 3, wherein the cooler further comprises an insulating wall wrapping the heat storage module.

6. The system according to claim 1, wherein the heat storage module uses at least one phase change material.

7. The system according to claim 6, wherein the heat storage module comprises a first zone filled with a first phase change material having a first melting temperature, and a second zone filled with a second phase change material having a second melting temperature higher than the first melting temperature.

8. The system according to claim 7, wherein the exchanger is arranged within the heat storage module and the exchanger extends within each of the first and second zones so as to be in successive heat exchange with each of the first and second phase change materials.

9. The system according to claim 8, wherein the exchanger is a counter-current exchanger, such that the dioxygen expanded by the expander is in heat exchange with the first phase change material and then the second phase change material, and the dihydrogen compressed by the compressor is in heat exchange with the second phase change material and then the first phase change material.

10. The system according to claim 7, wherein the first melting temperature is lower than −20° C., and the second melting temperature is between 0 and 20° C.

11. The system according to claim 10, wherein the first melting temperature is lower than −40° C., a dryer being arranged on the auxiliary circuit between the condenser and the expander.

12. The system according to claim 1, further comprising a piece of management equipment for managing the dihydrogen arranged on the main circuit between the compressor and the cooler, said piece of management equipment being connected to at least one high pressure tank, and configured so as to provide dihydrogen to the cooler intermittently.

13. The system according to claim 12, comprising at least one piece of distribution equipment arranged on the main circuit downstream of the cooler, the piece of management equipment being configured to provide dihydrogen to the cooler when the piece of distribution equipment is used.

14. The system according to claim 12, wherein the compressor is also configured so as to provide dihydrogen to the piece of management equipment intermittently, such that the pressure in said high pressure tank is between a minimum threshold and a maximum threshold.

15. The system according to claim 1, wherein the dioxygen and dihydrogen have at the outlet of the electrolyser pressures of at least 13 bar, advantageously at least 30 bar.

16. A method for producing dihydrogen characterised in that it comprises the steps of:
   electrolysing water in an electrolyser so as to produce dioxygen and dihydrogen;
   compressing the dihydrogen by a compressor;
   condensing residual water vapour mixed with the dioxygen in a condenser;
   expanding the dioxygen in an expander;
   cooling compressed dihydrogen by heat exchange with the dioxygen expanded via an exchanger in heat exchange with a heat storage module.

* * * * *